United States Patent Office 3,453,485
Patented July 1, 1969

3,453,485
DEFLECTOR SYSTEM FOR CORPUSCULAR-BEAM APPARATUS
Karl-Heinz Herrmann and Dieter Krahl, Berlin, Germany, assignors to Siemens Aktiengesellschaft, a corporation of Germany
Filed Mar. 14, 1967, Ser. No. 623,110
Claims priority, application Germany, Mar. 15, 1966,
S 102,522
Int. Cl. H01j 29/46, 29/56
U.S. Cl. 315—14        7 Claims

ABSTRACT OF THE DISCLOSURE

A corpuscular-beam apparatus with a field system for laterally deflecting the electron, ion or other corpuscular beam relative to the axis. A stigmator is operatively co-ordinated to the field-producing means of the system and has an electric excitation circuit connected to the excitation circuit of the field means. Thus the stigmator is excited in dependence upon the excitation of the deflector fields to the extent needed to automatically compensate for astigmatism due to changes in angular deflection of the beam.

---

Figure 1:
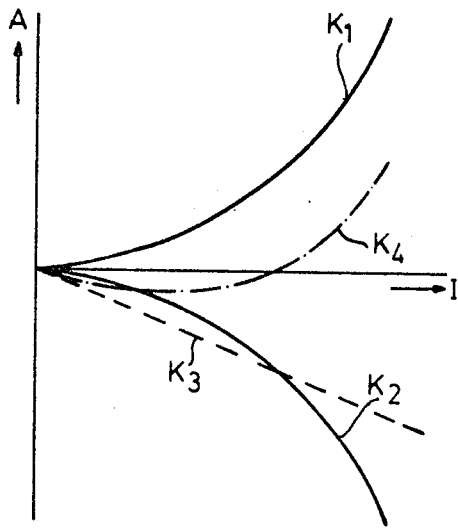

Our invention relates to a deflector system for corpuscular-beam apparatus in which a beam of electrons, ions or other corpuscles is deflected with the aid of electrical or magnetic fields produced by magnet coils or deflector electrodes mounted laterally of the beam axis as defined by the beam-producing and concentrating or focusing components of the apparatus.

When corpuscular beams are deflected by the electric or magnetic fields of such deflector systems, the beam becomes astigmatically distorted. When irradiating a specimen with such a distorted beam, the astigmatism manifests itself as a loss in intensity.

It is an object of our invention to avoid or greatly minimize such intensity losses due to deflection of corpuscular beams.

To this end, and in accordance with our invention, we provide the deflector system of such corpuscular-beam apparatus with a stigmator and cause this stigmator to produce an automatic correction of the deflecting astigmatism by deriving its excitation from the excitation of the deflector field system.

The invention is based upon the recognition that, when a corpuscular beam is subjected to deflection, the direction of the distortion caused by deflecting astigmatism is determined by the direction of deflection, i.e., the direction of the deflecting field, and the magnitude of the distortion is dependent upon angle of deflection. If the beam deflection is obtained electromagnetically by a field produced by two magnet coils located diametrically opposite to each other in substantially symmetrical relation to the normal beam axis, the resulting angle of deflection is proportional to the electric current flowing through the coils. Generally, the magnitude of the distortion caused by deflecting astigmatism also depends upon the intensity of the current through the coils.

This recognition has led us to the invention, according to which we coordinate a stigmator to the deflector system and connect the energizing circuit of the stigmator with the excitation circuit of the deflector system so that the deflector will produce an automatic correction of deflecting astigmatism at any occurring angle of deflection.

According to another feature of the invention, we preferably mount the stigmator ahead of the deflector system, relative to the issuing direction of the corpuscular beam.

The stigmator comprises a pair of coils or may also be composed of several such coil pairs. The coils of each pair are located opposite each other on different sides respectively of the normal beam axis, which is the axis of the beam obtaining when the deflector system is not in operation. The common center axis of each coil pair in the stigmator is perpendicular to an electrical or magnetical field of the deflector system, and also perpendicular to the direction of the beam. The magnetic fields produced by the two coils of each pair are opposed to each other, which requires correspondingly poling the voltages applied to the two coils or providing for a proper winding sense.

It is desirable to afford shifting the field-free point between the two opposite coils of the stigmator in a plane perpendicular to the beam direction. It is preferable, therefore, to electrically connect the coils in such a manner that they can be excited differently from each other. This is done, for example, by connecting respective adjustable resistors parallel to the respective coils of the pair. For accurately locating the field-free point at the center between the two opposite coils of the pair, the two coils must be excited by currents of equal intensity, assuming that they have the same design electromagnetically.

Figure 2:
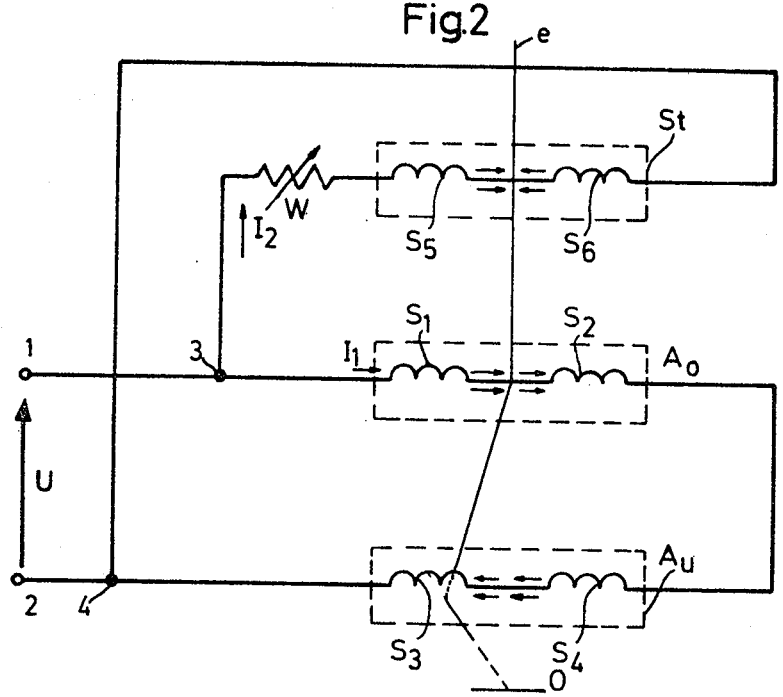
Figure 3:
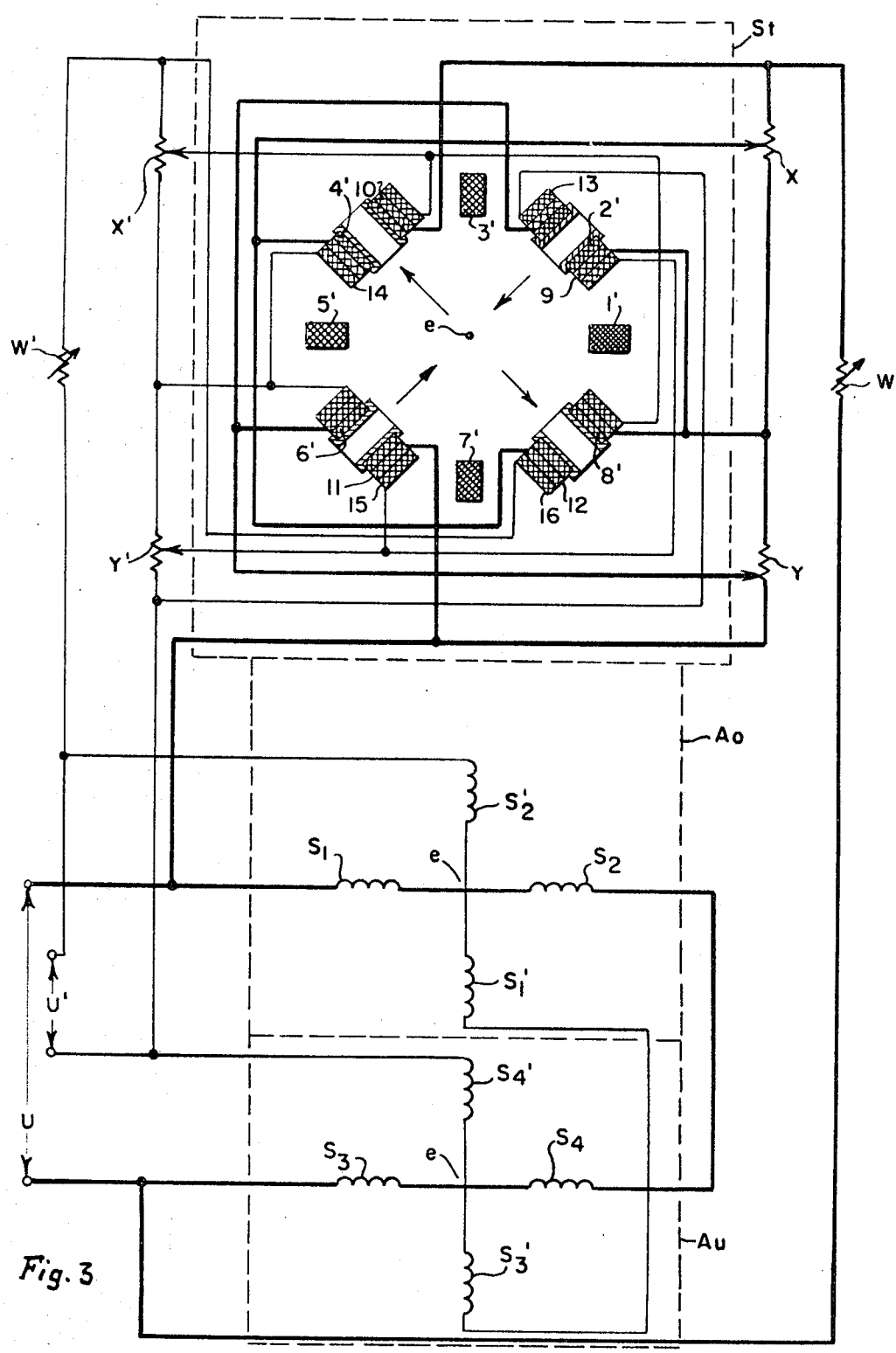

The invention will be further described with reference to the accompanying drawings in which:

FIG. 1 is an explanatory diagram.
FIG. 2 is a schematic circuit diagram of a deflector system according to the invention; and
FIG. 3 is a circuit diagram of a modified stigmator applicable in a deflector system otherwise corresponding to FIG. 2.

The diagram of FIG. 1 represents the amount of astigmatism A along the ordinate versus the intensity of excitation current I applied to the deflector system, this current being plotted along the abscissa. As will be apparent from the diagram, the astigmatism A does not increase linearly with the current I and hence with the angle of deflection. The astigmatism rather increases approximately with the square of the current intensity, corresponding to the curve $K_1$. If this astigmatism is to be fully compensated, the stigmator must be given an excitation approximately proportional to the square of the excitation applied to the deflector system. This calls for a counter-astigmatism or distortion approximately corresponding to the curve $K_2$ in FIG. 1.

Producing a pre-distortion according to curve $K_2$, however, requires relatively comprehensive circuitry if the stigmator and the deflector fields are to be excited from a single voltage source so that the excitation of the stigmator is strictly dependent upon the square of the deflector field excitation to provide for automatic correction of deflecting astigmatism according to the invention. For that reason it is preferable to restore to a pre-distortion according to curve $K_3$ as shown in FIG. 1. This is because such a moderate predistortion can be achieved simply by keeping the excitation of the stigmator directly proportional to the excitation of the deflector system. Such a substantially linear proportionality between the respective excitations of stigmator and deflector fields is obtainable by connecting the stigmator directly to the same voltage source as the deflector system.

Since the distortion caused by deflecting astigmatism differs from deflector system to deflector system, it is further preferable to connect resistor means in series with each coil pair of the stigmator, and to make the resistance of the resistor means adjustable or variable. This permits adapting the stigmator to any particular deflector system with which the stigmator is built together. Such an adaptation, as a rule, is require only once. After properly matching the stigmator, the distortion of the deflecting astigmatism resulting from a change in the deflecting angle is corrected automatically.

If the beam is deflected in two mutually perpendicular directions, then the deflector added in accordance with the invention is preferably equipped with two coil pairs which are arranged to have their respective axes extend perpendicularly to the two electrical or magnetic fields of the deflector system and perpendicularly to the normal direction of the beam.

Electron microscopes and other corpuscular-beam apparatus are sometimes equipped with electromagnetic stigmators located ahead of a deflector system for the purpose of correcting axial astigmatism. In such cases, the stigmator added to the deflector system in accordance with the present invention may have its coils mounted, as additional windings, on the electromagnetic stigmator serving in the conventional manner for correction of axial astigmatism.

The circuit diagram illustrated in FIG. 2 relates to a deflector system with a stigmator according to the invention, which for simplicity of the required circuitry, operates with a pre-distortion according to curve $K_3$ in the diagram of FIG. 1. A direct voltage U impressed between the terminals 1 and 2 provides excitation current $I_1$ for the upper deflector unit $A_o$ and for the lower deflector unit $A_u$ of the deflector system. The upper deflector unit $A_o$ comprises a pair of coils $S_1$ and $S_2$. The lower unit $A_u$ comprises a pair of coils $S_3$ and $S_4$. The coils $S_1$ and $S_2$ are traversed by the current $I_1$ in the same direction so that a magnetic field is formed between them in the direction indicated by arrows. The coils $S_3$ and $S_4$ of the lower unit $A_u$ are likewise traversed in the same direction by the excitation current $I_1$ and produce a magnetic field whose direction is also indicated by arrows.

The corpuscular beam, in this case an electron beam $e$, when entering from the beam source, such as an electron gun, into the active region of the magnetic field produced by the coils $S_1$ and $S_2$, becomes deflected in a direction perpendicular to the direction of the field. This direction of deflection in FIG. 2 is toward the front, namely out of the plane of illustration toward the observer. When the beam passes through the magnetic field produced between the coils $S_3$ and $S_4$ it becomes deflected back toward the original axis and then will someway impinge upon an object O. It will be understood that the deflected beam does not impinge upon coil $S_3$ (nor on any of the other coils) but—seen by the observer—extends past the coil $S_3$ in front of the plane of illustration.

According to the invention, the same voltage source that furnishes the voltage U for the deflector units $A_o$ and $A_u$, is connected to the terminal points 3 and 4 of a stigmtor $St$ which comprises two coils $S_5$ and $S_6$. Due to this circuit connection, the excitation of the stigmator coils is directly proportional to the excitation of the deflector coils. The stigmator coils $S_5$ and $S_6$ are so poled that a current $I_2$ driven through the coils by the voltage U will produce mutually opposed magnetic fields, this being indicated by arrows pointing toward each other. This magnetic field in the stigmator $St$ causes a pre-distortion of the beam $e$ according to curve $K_3$ of FIG. 1. As a result, the distortion resulting from the effect of the upper and lower deflector units $A_o$ and $A_u$ is nearly eliminated. The operation approximately corresponds to curve $K_4$ in FIG. 1.

As mentioned, the compensation of deflecting astigmatism requires the coils $S_5$ and $S_6$ of the stigmator $St$ to be excited in opposition to each other. Complete compensation of deflecting astigmatism further requires that the coils $S_5$ and $S_6$, with respect to their common center axis, be arranged perpendicularly to the magnetic fields of the deflector units $A_o$ and $A_u$ as well as perpendicularly to the direction of the corpuscular beam.

For adapting the stigmator $St$ to the deflector system of units $A_o$ and $A_u$, the coil circuit of the stigmator is provided with resistor means of variable or adjustable resistance. These resistor means may be constituted by a resistor network but, as shown, may also consist of a single adjustable resistor W. In any event, the resistor means are also traversed by the stigmator excitation current $I_2$.

If the deflector system, in distinction from the embodiment shown in FIG. 2, is provided with deflector field means that deflect the corpuscular beam in two mutually perpendicular directions, the stigmator must also be equipped with two pairs of suitably arranged coils, if the distortion due to deflecting astigmatism is to be properly compensated. Such a modified stigmator with two pairs of coils is illustratated in FIG. 3.

Shown in FIG. 3, one above the other, are the three different planes in which the stigmator $St$, the upper deflector unit $A_o$ and the lower deflector unit $A_u$ are located. Although, as shown in FIG. 2, these three planes are parallel to each other and perpendicular to the beam normal axis, they are—for the purpose of lucid illustration—shown in FIG. 3 rotated 90° so that each of them lies in the plane of illustration and the electron beam $e$ appears three times, namely as a central point in each of the three units.

In the deflector system of FIG. 3 the two deflector units $A_o$ and $A_u$ contain not only the coil pairs $S_1$, $S_2$ and $S_3$, $S_4$ apparent from FIG. 2, but are also provided with additional pairs of coils denoted by $S_1'$, $S_2'$ and $S_3'$, $S_4'$ respectively. Each of the coil pairs $S_1$, $S_2$ and $S_3$, $S_4$ described above with reference to FIG. 2 effects a deflection of the electron beam $e$ in a plane perpendicular to the common axis of these coil pairs. In contrast thereto, the additional coil pairs $S_1'$, $S_2'$ and $S_3'$, $S_4'$ serve to deflect the electron beam $e$ in a plane perpendicular to the one just mentioned. The coils that produce a beam deflection in one plane are energized by a voltage U, and the coils that produce a deflection in the other plane are energized by a voltage $U'$.

The stigmator $St$ in the embodiment of FIG. 3 comprises eight spool bodies equipped with first coils 1' to 8' which constitute a conventional electromagnetic stigmator for correction of axial astigmatism. The circuitry and performance of this eight-pole stigmator, composed of pairwise arranged coils in a rotationally symmetrical arrangement relative to the beam normal axis, need not be further described since such devices are known as such, for example from U.S. Patent 2,547,994. According to the invention, however, two additional stigmator devices are provided of which one is coordinated to the deflector coils $S_1$, $S_2$ and $S_3$, $S_4$, whereas the other stigmator device relates to the two other coil pairs in the deflector units $A_o$ and $A_u$. For distinction, the components and electric leads pertaining to the deflector coils $S_1$, $S_2$ and $S_3$, $S_4$ are shown by heavy lines, and the components and leads relating to the other deflector coils are shown by thin lines.

Arranged on coils 2', 4', 6' and 8' are respective stigmator coils 9 to 12 which constitute the additional stigmator device coordinated to the deflector coils $S_1$, $S_2$ and $S_3$, $S_4$. The stigmator coils 9 to 12 are energized proportional to the voltage U from variable potentiometer resistors X and Y. Each two opposingly located stigmator coils 9 and 11, or 10 and 12 are connected in series so that the magnetic fields produced by the two coils of a pair oppose each other, this being symbolized by arrows at the respective coils. The direction of the arrows, of course, depends upon chosen setting of the resistors X and Y and hence may be reversed, although the coil fields of each pair always remain opposed to each other. The resistors X and Y which are connected parallel to the stigmator coils to energize them by the adjusted voltage drop, are connected to the voltage U through the series resistor W corresponding to the resistor W shown in FIG. 2.

The potentiometer resistors $X'$ and $Y'$ for the stigmator coils 13 to 16 coordinated to the respective deflector coils $S_1'$, $S_2'$ and $S_3'$, $S_4'$, are energized from the voltage $U'$ through another series resistor $W'$. The stigmator coils 13 to 16 are mounted on the other stigmator coils 9 to 12 respectively, and hence sit on the spool bodies of the axial-correction stigmator. It will be understood that the mounting sequence of the different coils may differ from the one just described. The circuit connection of the stigmator coils 9 to 12 is analogous to that of the stigmator coils 9 to 12 described above.

The potentiometers X, Y and X', Y' permit adjusting the axis of the stigmator device to coincidence with the normal axis of the electron beam $e$. This is done by displacing the potentiometer taps so that the voltage impressed on one of the two coils of a particular coil pair is reduced while the voltage applied to the other coil of the same pair is increased.

While in the embodiment of FIG. 3 the stigmator for correction of deflecting astigmatism is combined with the stigmator for correction of axial astigmatism, the stigmator $St$ according to the invention may also form a set of coils separate from the stigmator for correction of axial astigmatism or may be used in apparatus not equipped with a stigmator for axial correction.

In summary, the invention provides a deflector system for corpuscular-beam apparatus in which a stigmator imposes a pre-distortion upon the beam in order to compensate the astigmatism caused by the deflecting operation of the deflector system. After the stigmator is once adapted to the appertaining deflector system, the compensation of changes in deflecting astigmatism caused by changes of the deflecting angle takes place automatically regardless of the deflecting angle obtaining at a time.

To those skilled in the art it will be obvious upon a study of this disclosure that our invention permits of various changes with respect to arrangement of components and circuitry, and hence may be given embodiments other than particularly illustrated and described herein, without departing from the essential features of our invention and within the scope of the claims annexed hereto.

We claim:
1. In corpuscular-beam apparatus defining a normal beam axis, the combination of a deflector system comprising beam-deflector field means located laterally of the beam axis, electric circuit means connected with said field means for exciting said field means to deflect the corpuscular beam relative to said axis, a first stigmator coordinated to said field means and having an excitation circuit connected to said circuit means for exciting said first stigmator in dependence upon the excitation of said deflector field means to compensate for astigmatism due to beam deflection, said first stigmator being mounted ahead of said deflector field means relative to the beam propagating direction and comprising at least one pair of coaxial coils spaced from each other on opposite lateral sides respectively of said beam axis, the common axis of said coils extending at an angle to the field direction of said field means and perpendicularly to said beam axis, said coils of said pair having mutually opposed magnetic fields when excited by said excitation circuit, and a second stigmator device for correction of axial astigmatism, said coils of said first stigmator being mounted on said second stigmator device whereby said second stigmator device for correction of axial astigmatism and said first stigmator for compensation of deflecting astigmatism form conjointly a single structural unit.

2. In a beam deflector system according to claim 1, said two stigmator coils of said pair having equal excitation currents in said excitation circuit.

3. In a beam deflector system according to claim 1, said excitation circuit comprising current-control means for setting said stigmator coils to respectively different amounts of excitation.

4. In a beam deflector system according to claim 1, the excitation of said stigmator being substantially linearly proporational to the deflector excitation.

5. In a beam deflector system according to claim 1, said circuit means comprising a voltage source, and said excitation circuit of said stigmator being connected to said voltage source so that the source voltage supplies excitation for said field means and proportional excitation of said stigmator.

6. In a beam deflector system according to claim 1, said excitation circuit of said stigmator comprising adjustable resistance means in series with each of said coil pairs for adjusting said stigmator to said deflector field means.

7. In a beam deflector system according to claim 1, said stigmator comprising two of said coil pairs having respective common axes perpendicular to each other.

References Cited

UNITED STATES PATENTS 3,150,258    9/1964    Wilska _____ 315—31 X
3,371,206    2/1968    Takizawa.

RODNEY D. BENNETT, JR., *Primary Examiner.*

C. L. WHITHAM, *Assistant Examiner.*

U.S. Cl. X.R.

250—495; 315—31